United States Patent
Frederiksen et al.

(10) Patent No.: US 8,971,798 B2
(45) Date of Patent: Mar. 3, 2015

(54) ESTABLISHMENT OF NEW BASE STATION IN CELLULAR NETWORK

(75) Inventors: Frank Frederiksen, Klarup (DK); Kari Veikko Horneman, Oulu (FI); Klaus Ingemann Pedersen, Aalborg (DK); Markku Juha Vainikka, Kiviniemi (FI); Vinh Van Phan, Oulu (FI); Seppo Ilmari Vesterinen, Oulunsalo (FI); Ling Yu, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 855 days.

(21) Appl. No.: 13/131,909

(22) PCT Filed: Dec. 1, 2008

(86) PCT No.: PCT/EP2008/066512
§ 371 (c)(1),
(2), (4) Date: Jul. 19, 2011

(87) PCT Pub. No.: WO2010/063306
PCT Pub. Date: Jun. 10, 2010

(65) Prior Publication Data
US 2011/0281590 A1    Nov. 17, 2011

(51) Int. Cl.
| | | |
|---|---|---|
| H04B 7/185 | (2006.01) |
| H04W 24/02 | (2009.01) |
| H04W 16/18 | (2009.01) |
| H04W 16/32 | (2009.01) |
| H04W 48/16 | (2009.01) |
| H04W 92/20 | (2009.01) |

(52) U.S. Cl.
CPC .............. *H04W 24/02* (2013.01); *H04W 16/18* (2013.01); *H04W 16/32* (2013.01); *H04W 48/16* (2013.01); *H04W 92/20* (2013.01)
USPC .......................................... 455/13.1; 455/449

(58) Field of Classification Search
USPC .................................................. 455/449, 13.1
See application file for complete search history.

(56) References Cited

U.S. PATENT DOCUMENTS

| | | | |
|---|---|---|---|
| 2007/0097939 A1* | 5/2007 | Nylander et al. | 370/338 |
| 2007/0105527 A1* | 5/2007 | Nylander et al. | 455/403 |
| 2010/0184421 A1* | 7/2010 | Lindqvist et al. | 455/418 |
| 2010/0240379 A1* | 9/2010 | Kishiyama et al. | 455/450 |

FOREIGN PATENT DOCUMENTS

| | | |
|---|---|---|
| EP | 1 858 273 A2 | 11/2007 |
| EP | 1 947 811 A1 | 7/2008 |
| WO | WO 01/45347 A2 | 6/2001 |
| WO | WO 2005/120101 A1 | 12/2005 |
| WO | WO 2008/015562 A2 | 2/2008 |

* cited by examiner

Primary Examiner — Justin Lee
(74) Attorney, Agent, or Firm — Harrington & Smith

(57) ABSTRACT

A method, apparatus, and computer program for authenticating a newly activated local area base station in a cellular network is presented. The newly activated local area base station, associated with a sub-cell located within a coverage area of a wide area base station of a cellular telecommunication system, is paired with the wide area base station on the basis of information enabling identification of the wide area base station and originating from the local area base station. Then, transfer of a radio communication identifier to the local area base station is arranged over a wired connection.

17 Claims, 4 Drawing Sheets

ESTABLISHMENT OF NEW BASE STATION IN CELLULAR NETWORK

FIELD

The invention relates to the field of cellular radio telecommunications.

BACKGROUND

A network operator designs and builds a cellular telecommunication system through a thorough network planning where capacity and coverage issues are taken into account for each geographical location, and base station sites are selected to meet the desired capacities and coverage. Recent cellular telecommunication systems have been provided with features that enable the addition of new base stations that are not part of the network planning of the operator but rather deployed in an uncoordinated fashion. One definition for such a base station is a home Node B used in connection with the latest evolution versions of a Universal Mobile Telecommunication System (UMTS). A home Node B is a private base station dedicated to serve certain, dedicated user terminals. However, such base stations deployed outside the scope of the network planning may include other types of base stations than home Nodes B.

BRIEF DESCRIPTION

According to an aspect, there is provided a method which comprises: pairing a newly activated local area base station, associated with a sub-cell located within a coverage area of a wide area base station of a cellular telecommunication system, with the wide area base station on the basis of information enabling identification of the wide area base station and originating from the local area base station. The method further comprises: arranging transfer of a radio communication identifier to the local area base station over a wired connection.

In an embodiment of the method, the radio communication identifier transferred to the local area base station comprises a cellular network identifier to be used in wireless communication between the local area base station and the wide area base station.

In another embodiment of the method, the radio communication identifier transferred to the local area base station comprises a random access channel preamble used by the local area base station when establishing a communication connection with the wide area base station.

In an embodiment, the method further comprises: arranging transfer of parameters needed for establishment of a signaling radio bearer between the local area base station and the wide area base station, wherein the parameters are transferred over the wired connection; and establishing the signaling radio bearer according to the transferred parameters.

In another embodiment, the method is executed in the local area base station and further comprises: activating the local area base station; establishing the wired connection with a network element of the cellular telecommunication system; detecting, in the local area base station, the wide area base station capable of providing the local area base station with determined management services, wherein the detection is based on information contained in a radio signal received from the wide area base station; and transmitting the information identifying the wide area base station to the network element. In a further embodiment, the detection comprises: receiving, from one or more wide area base stations a broadcast signal; determining, from base station classification information contained in the received broadcast signals, whether or not one or more of the wide area base stations are provided with capability to perform operation and management operations with respect to other base stations; and selecting a wide area base station equipped with the capability to serve the local area base station.

In another embodiment, the method is executed in a network element operationally connected to the local area base station and the wide area base station. The method further comprises: receiving information identifying the wide area base station from the local area base station; transmitting to the wide area base station a message comprising a request for assignment of the radio communication identifier to the local area base station; receiving from the wide area base station a message comprising the assigned radio communication identifier of the local area base station; and transmitting the radio communication identifier to the local area base station.

In another embodiment, the method is executed in the wide area base station and further comprises: receiving, in the wide area base station, a request for assignment of the radio communication identifier to the local area base station through a wired connection; assigning the radio communication identifier to the local area base station; and transmitting the radio communication identifier to the local area base station over the wired connection.

The above-described embodiments of the method may be executed by a computer program product embodied on a computer readable distribution medium as specified in claim 18.

According to another aspect, there is provided an apparatus comprising a controller configured to pair a newly activated local area base station, associated with a sub-cell located within a coverage area of a wide area base station of a cellular telecommunication system, with the wide area base station on the basis of information enabling identification of the wide area base station and originating from the local area base station, and to arrange transfer of a radio communication identifier to the local area base station over a wired connection.

According to another aspect, there is provided an apparatus comprising means for pairing a newly activated local area base station, associated with a sub-cell located within a coverage area of a wide area base station of a cellular telecommunication system, with the wide area base station on the basis of information enabling identification of the wide area base station and originating from the local area base station. The apparatus further comprises means for arranging transfer of a radio communication identifier to the local area base station over a wired connection.

LIST OF DRAWINGS

Embodiments of the present invention are described below, by way of example only, with reference to the accompanying drawings, in which FIG. 1A illustrates cellular communication environment to which embodiments of the invention may be applied;

DESCRIPTION OF EMBODIMENTS

Exemplary embodiments of the present invention will now be described more fully hereinafter with reference to the accompanying drawings, in which some, but not all embodiments of the invention are shown. In fact, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1A:
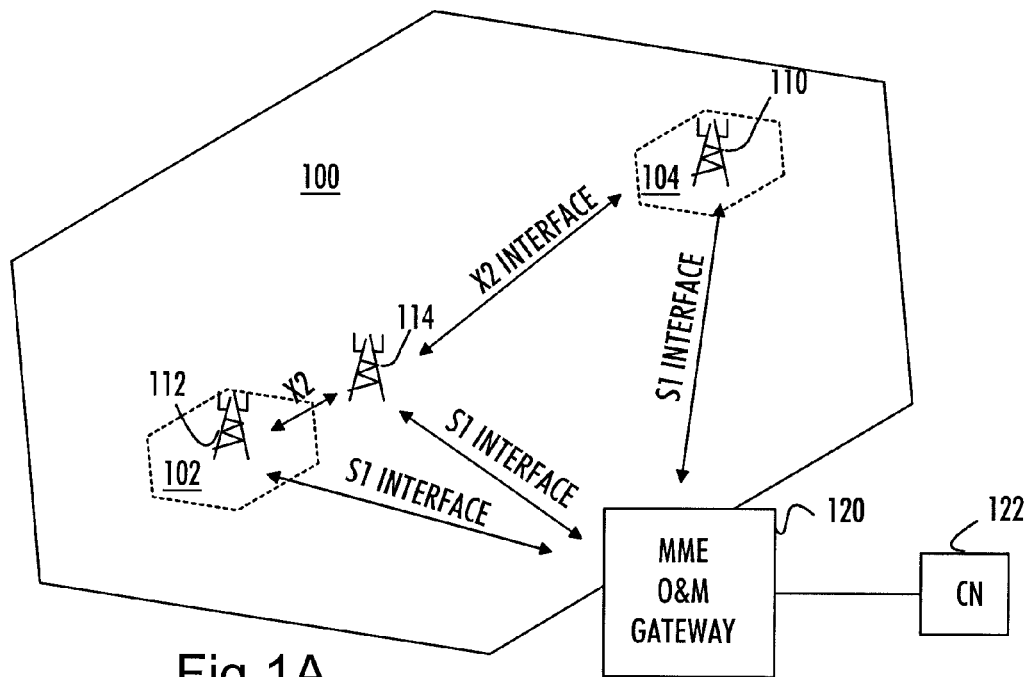
FIG. 1B illustrates connections between elements of the cellular network.

FIG. 1A illustrates a typical communication scenario in a cellular telecommunication network according to latest evolution versions (LTE) of the UMTS (Universal Mobile Telecommunication System). The network is designed to be self-organizing and to support flexible spectrum use between different cells and even different operators. After all, the latest cellular telecommunication systems support shared spectrum utilization between different operators operating in the same area. As a result of the self-organizing nature of the network, the network supports easy "plug-and-play" establishment of new base stations in the network. Upon detection of a new base station in the network, the network instantly configures the base station with parameters required for operating in the network, wherein the parameters include cellular radio network identifier, signaling parameters, radio resources, etc. Therefore, the network supports emergence of private base stations (home Nodes B) dedicated to serve certain, dedicated user terminals in the network. Base stations other than private base stations, e.g. relay base stations relaying connections between a base station and user terminals, may emerge in an uncoordinated fashion in the cellular network. Let us from now on call such base stations local area base stations, because their coverage is typically small compared with that of base stations deployed in the network in a coordinated fashion through network planning by an operator. Let us refer to the base stations deployed in such coordinated fashion as wide area base stations. A wide area base station may control a macro cell in the network, but it may alternatively control a cell with a smaller coverage area, e.g. a micro cell, particularly in areas with high-density traffic requirements.

Referring to FIG. 1A, a wide area base station or wide area Node B (from now on referred to as WBS) 114 provides communication services to user terminals within its coverage area defined as a cell 100. Additionally, the WBS may provide communication services to local area base stations or local area Nodes B (from now on referred to as LBS) 110, 112 deployed within the cell 100. Each LBS 110, 112 has its own coverage area which may be called a sub-cell 102, 104. The sub-cells 102, 104 may be located within the coverage area of the cell 100. It is to be noted that the sub-cells may be operationally independent from the macro cell of the WBS 114. The sub-cell may be, for example, a private cell served by the private base station or a public pico or femto cell.

A communication connection may be established between the WBS 114 and LBSs 110, 112 for exchange of at least signaling information between the base stations 110 to 114. The communication connection between the base stations 110 to 114 is referred to as an X2 interface in the 3GPP ($3^{rd}$ Generation Partnership Project) specifications for E-UTRAN (enhanced UMTS terrestrial radio access network). The X2 interface may transfer control information, including inter-cell power control information, radio resource control parameters, and other information on communication parameters of the base stations, etc. Each LBS 110, 112 may establish an X2 connection with the WBS 114. In some cases, the wired X2 connection may not be available, e.g. in connection with private base stations. Then, the signaling connection between the LBS and the WBS may be carried out over the air interface. One option is to include an embedded user terminal device in the LBS to communicate with WBS by using the Uu interface, i.e., the regular interface between a user terminal and a base station. Another option is to implement the signaling connection between the LBS and the WBS over a backhaul air interface. The wireless backhaul may be defined for use in connection with relay base stations, but it can be applied to other types of LBSs as well. The wireless backhaul can be considered as an enhanced wireless X2 connection.

The base stations 110 to 114 are also connected to other elements 120 of the cellular network through wired connections. A wired connection may be established to a mobility management entity (MME) controlling the mobility of the mobile terminals in the cellular network. In other words, the MME 120 is a higher mobility control entity serving as an anchoring point for mobile terminal connections. The wired connection may also be established to one or more gateway nodes through which data routing is performed and to one or more operation and maintenance (O&M) servers configuring operational parameters of the base stations in the cellular network. The interface between each base station 110 to 114 and the other elements 120 of the cellular network is known as S1 interface in the 3GPP specifications for E-UTRAN. Further, the wired connections extend to a core network 122 and to other networks.

Figure 1B:
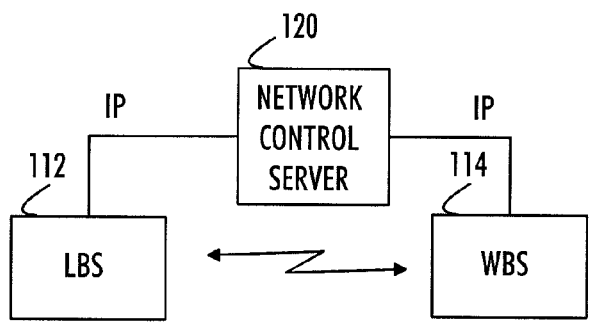
Figure 2:
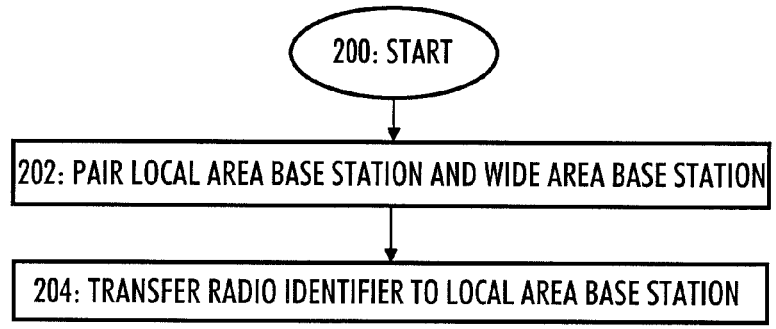
FIG. 2 is a flow diagram illustrating a process for pairing base stations according to an embodiment of the invention.

FIG. 1B illustrates communication connections a newly activated LBS 112 establishes upon configuration to operate in the cellular network. The LBS 112 establishes a wired Internet protocol (IP) connection with a network control server (NCS) 202 which may be, for example, the O&M server, MME, or a gateway node capable of communicating with both the LBS 112 and the WBS 114. The WBS 114 has also a wired IP connection with the NCS 120. However, if the NCS 120 and WBS 114 are located physically in the same place, the connection between the NCS 120 and WBS 114 may be implemented by means other than the IP connection. This may be the case when the WBS 114 executes the functionalities of the NCS 120. Additionally, the LBS 112 and the WBS 114 establish a wireless radio connection with each other. The wireless connection may be established after authentication of the LBS 112 carried out over the wired IP connection. FIG. 2 illustrates a general concept of a process for carrying out the authentication of the LBS 112. Referring to FIG. 2, the process starts in block 200.

In block 202, the LBS 112 is paired with the WBS 114. The pairing may be made on the basis of information enabling identification of the WBS 114 and originating from the LBS 112. Accordingly, the LBS may explicitly identify the WBS it wants to be served by and transmit a corresponding request over the wired IP connection to the NCS 120. This may be carried out by detecting broadcast signals broadcasted by different WBSs and selecting a WBS that is supporting the services the LBS 112 needs. Alternatively, the NCS 120 may deduce the WBS capable of serving the LBS from location information received from the LBS in connection with establishment of the wired IP connection. The location information of the LBS may be deduced from the IP address of the LBS, for example. In block 204, authentication of the LBS 112 is carried out and a radio communication identifier is transferred to the LBS 112 over the wired connection. Then, the LBS 112 is able to establish the wireless connection with the base station by using the received radio communication identifier. Authentication of the LBS 112 over the wired connection has the advantage that the LBS 112 does not have to be equipped with a (conventional) user terminal module or to execute all conventional cellular access and security procedures to be able to communicate with the WBS 114 over the air interface, which simplifies the structure of the LBS 112 and reduces signaling overhead. On the other hand, identification of the selected WBS 114 by the LBS 112 speeds up and simplifies the pairing procedure, because the network does not have to select the WBS to serve the LBS 112.

The process of FIG. 2 may be implemented in an apparatus comprising a controller configured to carry out the steps of FIG. 2. The general concept process of FIG. 2 may be carried out in the LBS 112, the NCS 120, and/or the WBS 114. With respect to the LBS 112, the LBS 112 detects and selects the WBS 114 in block 202 and receives the radio communication identifier in block 204. With respect to the NCS 120, the NCS 120 makes the pairing in block 202 in response to the reception of the request from the LBS 112. The pairing may comprise forwarding the request to the selected WBS 114 in order to carry out the authentication and assignment of the identifier. In block 204, the NCS 120 may receive the radio communication identifier from the WBS 114 and convey it to the LBS 112. With respect to the WBS 114, the WBS makes the pairing upon reception of the request from the NCS 120 and determination to serve the LBS 112. Then, the WBS 114 may assign the radio communication identifier to the LBS and transmit the identifier over the IP connection to the LBS through the NCS 120. The radio communication identifier may be a cellular radio network temporary identifier (C-RNTI) defined in the 3GPP specifications or a corresponding identifier unique to each wireless entity within a geographically limited area and allocated by the self-organizing cellular network. Alternatively (or additionally), the radio communication identifier transferred to the LBS 112 over the wired connection may be or may include a dedicated random access channel (RACH) preamble that the LBS 112 may use so as to establish a wireless connection with the WBS. Additionally, other initial configuration information may be transferred to the LBS 112 over the wired connection. Such information may include, for example, radio-bearer configurations to be used in communication with the WBS and an initial transmit power setting to prevent the LBS 112 from causing excessive interference in a radio interface.

Figure 3:
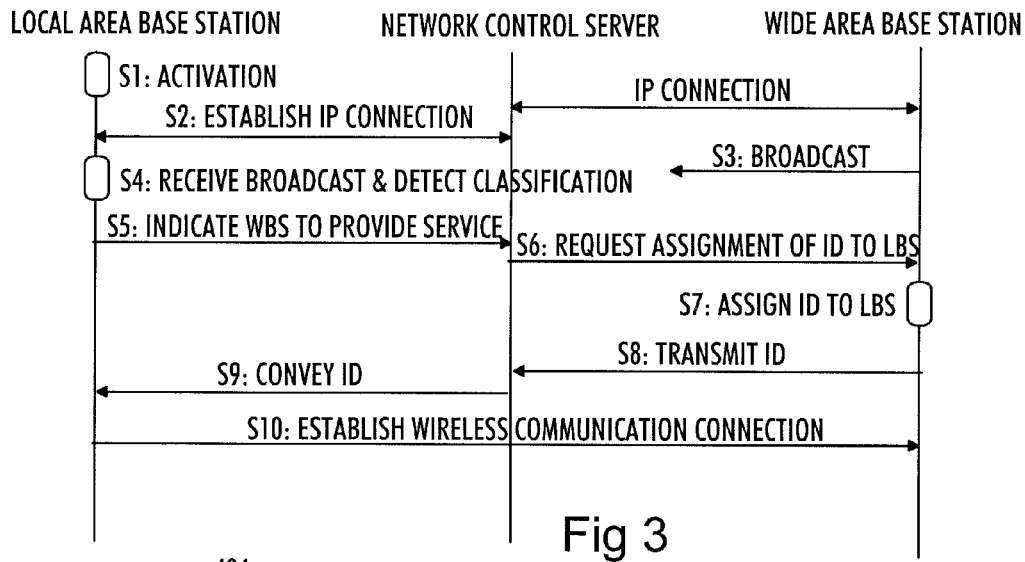
FIG. 3 is a signaling diagram illustrating an embodiment of a process for carrying out authentication of a new base station.

FIG. 3 is a signaling diagram illustrating the process of FIG. 2 in more detail. Initially, the wired IP connection has been established between the NCS and the WBS. In S1, the LBS is activated. In this context, the activation may represent powering up or resetting the LBS. Upon activation of the LBS, the LBS establishes a wired IP connection with the NCS in S2. In S3, the WBS broadcasts a radio signal comprising an identifier (a permanent global identifier unique to the WBS in the whole cellular network) of the WBS and information on the capabilities of the WBS. The broadcasting is carried out continuously. The capabilities may be informed by broadcasting a classification of the WBS. The WBSs may be classified according to their capabilities to carry out O&M and/or radio resource management operations. O&M functionalities may include cell (LBS) configuration upon activation of a new cell, reset, reactivation or removal of LBSs, etc. Radio resource management functionalities may include spectrum load balancing and inter-cell interference coordination and control (ICIC) in overlapping WBS/LBS coverage. Additionally, the classification may define whether or not a WBS is capable of relaying S1 and/or X2 interfaces to LBSs.

In S4, the LBS receives the broadcast radio signal from the WBS and detects the classification of the WBS. The LBS receives corresponding broadcast signals from other neighboring WBSs. Then, the LBS compares the classification of the WBSs with a predetermined required classification of the LBS. The required classification may depend on the characteristics of the LBS and/or connections available to the LBS. For example, if the LBS does not have a wired S1 and/or X2 connection available, the LBS requires a WBS with S1 and/or X2 wireless relaying capability. Upon detection of one or more WBSs that have the classification corresponding to the required classification, the LBS selects one of the WBSs to serve the LBS and indicates in S5 the identity of the selected WBS to the NCS. This may be carried out by transmitting a request message to the NCS over the wired IP connection. The request message comprises a request for configuring the LBS to operate in the network and the identifier of the WBS which should carry out the configuration. The WBS is configured to assign at least an identifier to the LBS for use in wireless communication with the WBS. As a consequence, the NCS requests the WBS to assign the identifier to the LBS in S6 by transmitting a corresponding message to the WBS over the wired IP connection between the WBS and the NCS. In S7, the WBS assigns the identifier to the LBS from a set of available identifiers. In S8, the WBS transmits the assigned identifier over the IP connection to the NCS which conveys the identifier in S9 to the LBS over the corresponding wired IP connection. In S10, the LBS establishes a wireless communication connection with the base station by using the received identifier. The establishment of the communication connection comprises establishment of a new signaling radio bearer between the LBS and the WBS. If the identifier is the C-RNTI or a corresponding identifier used throughout the communication, the assignment of the C-RNTI may be omitted from the establishment of the signaling radio bearer. If the identifier is the RACH preamble, the LBS transmits the RACH preamble on RACH to the WBS and, upon reception of the RACH preamble from the LBS, the WBS assigns the C-RNTI to the LBS and the establishment of the signaling radio bearer is started. If the identifier includes both the C-RNTI and the dedicated RACH preamble and, in addition, configurations of the signaling radio bearer(s) to be used, the LBS uses the assigned RACH preamble and C-RNTI to synchronize and gain access to the WBS in the uplink. The LBS access to the downlink may be carried out already in S3 and S4. Then, the LBS and the WBS may use the radio bearer configurations provided to communicate with each other right away in both the uplink and the downlink.

In an embodiment where the NCS selects the WBS to server the LBS, the NCS receives in S2 from the LBS information enabling the NCS to determine the location of the LBS. Such information may comprise an IP address of the LBS. Upon deduction of the location of the LBS, the NCS may check for a WBS that is close to the location of the LBS and configured with functionalities to carry out the identifier assignment, select such a WBS and request for the assignment of the identifier to the LBS from the selected WBS. In this embodiment, steps S4 and S5 may be omitted from the authentication, and steps S6 to S10 may be executed accordingly.

In case the NCS is in charge of C-RNTI allocation in the area where the WBS resides, the NCS receiving the request from the LBS in S5 may assign the C-RNTI to the LBS and inform both WBS and the LBS of the assigned C-RNTI over the wired connection. In this case, S6 is omitted, S7 is carried out in the NCS, and S8 is signaled from the NCS to the WBS. Furthermore, S9 is also modified in the sense that the identifier (C-RNTI) originates from the NCS.

According to the 3GPP specifications, signaling radio bearers are radio bearers that are used for transmission of radio resource control (RRC) and non-access stratum (NAS) messages. Current specifications define three types of signaling radio bearers: SRB0, SRB1, and SRB2. SRB0 is for RRC messages using the common control channel (CCCH) logical channel. SRB1 is for RRC messages (which may include a piggybacked NAS message) as well as for NAS messages prior to the establishment of SRB2, all using a dedicated control channel (DCCH) logical channel. SRB2 is for NAS messages using a DCCH logical channel. SRB2 has a lower-priority than SRB1 and is always configured by E-UTRAN after security activation. The signaling radio bearer established between the LBS and the WBS may be of type SRB1, or even a new type of signaling radio bearer may be defined for this connection type. The exact parameters of the new signaling radio bearer are, however, beyond the scope of the present invention. Furthermore, use of the SRB0 or SRB2 is not excluded. In order to facilitate the establishment of the signaling radio bearer between the LBS and the WBS, at least some of the parameters of the signaling radio bearer may be defined beforehand in the WBS and transmitted from the WBS to the LBS over the wired IP connection. Table 1 below contains parameters for SRB1 and Table 2 for SRB2 that may be transmitted over the wired connection. This speeds up the establishment of the signaling radio bearer, because the negotiation of the parameters over the radio interface can be omitted.

TABLE 1

| Parameter Name | Parameter Value | Semantics Description |
|---|---|---|
| RLC configuration CHOICE ul-RLC-Config | am | |
| >t-PollRetransmit | 45 | |
| >pollPDU | Infinity | |
| >PollByte | Infinity | |
| >maxRetxThreshold | 4 | |
| dl-RLC-Config | | |
| >t-Reordering | 35 | |
| >t-StatusProhibit | 0 | |
| Logical Channel Configuration | | |
| priority | 1 | Highest priority |
| prioritizedBitRate | Infinity | |
| logicalChannelGroup | 0 | |

TABLE 2

| Parameter Name | Parameter Value | Semantics Description |
|---|---|---|
| RLC configuration CHOICE ul-RLC-Config | am | |
| >t-PollRetransmit | 45 | |
| >pollPDU | Infinity | |
| >PollByte | Infinity | |
| >maxRetxThreshold | 4 | |
| dl-RLC-Config | | |
| >t-Reordering | 35 | |
| >t-StatusProhibit | 0 | |
| Logical Channel Configuration | | |
| priority | 3 | |
| prioritizedBitRate | Infinity | |
| logicalChannelGroup | 0 | |

Figure 4:
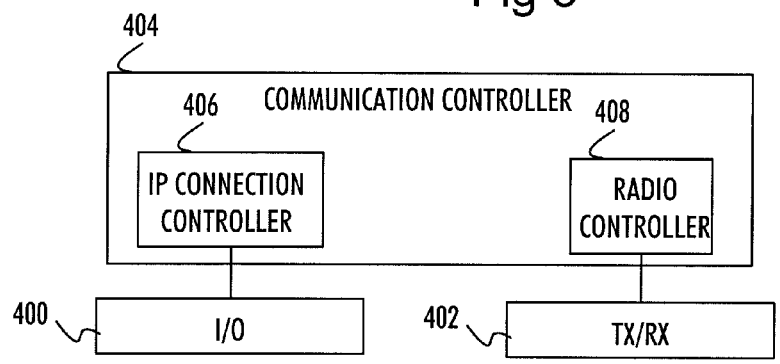
FIG. 4 illustrates an exemplary structure of a local area base station according to an embodiment of the invention.
Figure 5:
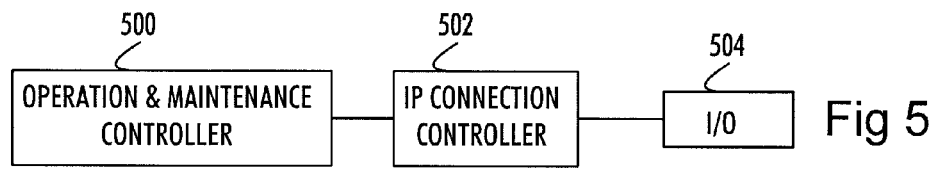
FIG. 5 illustrates an exemplary structure of a network control server according to an embodiment of the invention.
Figure 6:
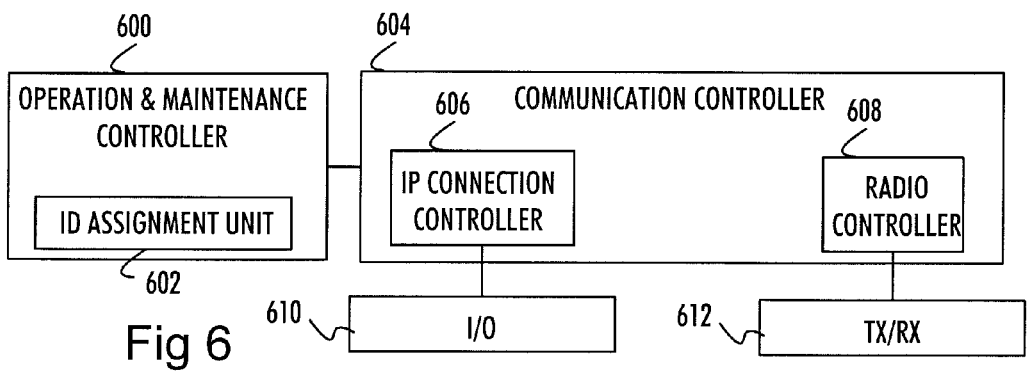
FIG. 6 illustrates an exemplary structure of a wide area base station according to an embodiment of the invention.
Figure 7:
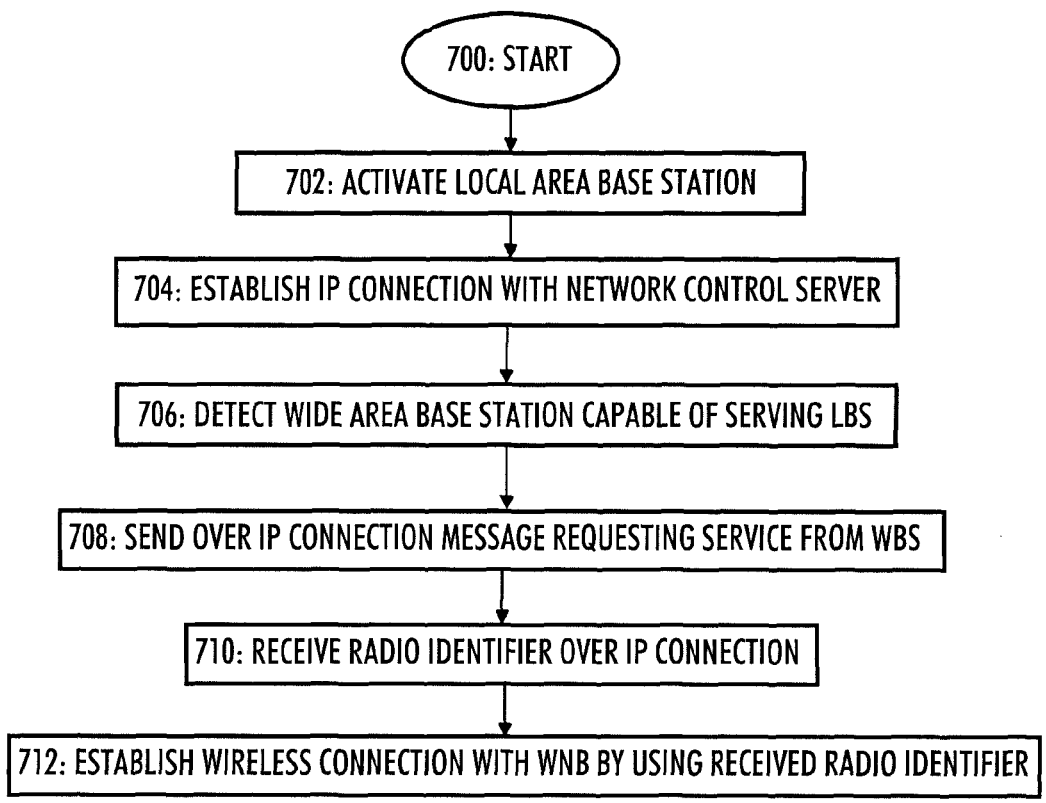
FIG. 7 illustrates a process for carrying out authentication in the local area base station of FIG. 4.
Figure 8:
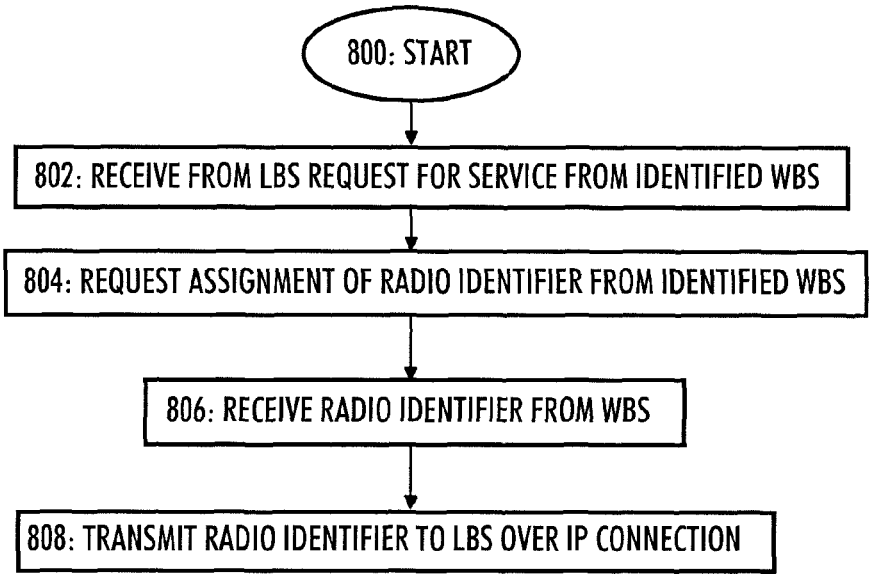
FIG. 8 illustrates a process for carrying out authentication in the network control server of FIG. 5.
Figure 9:
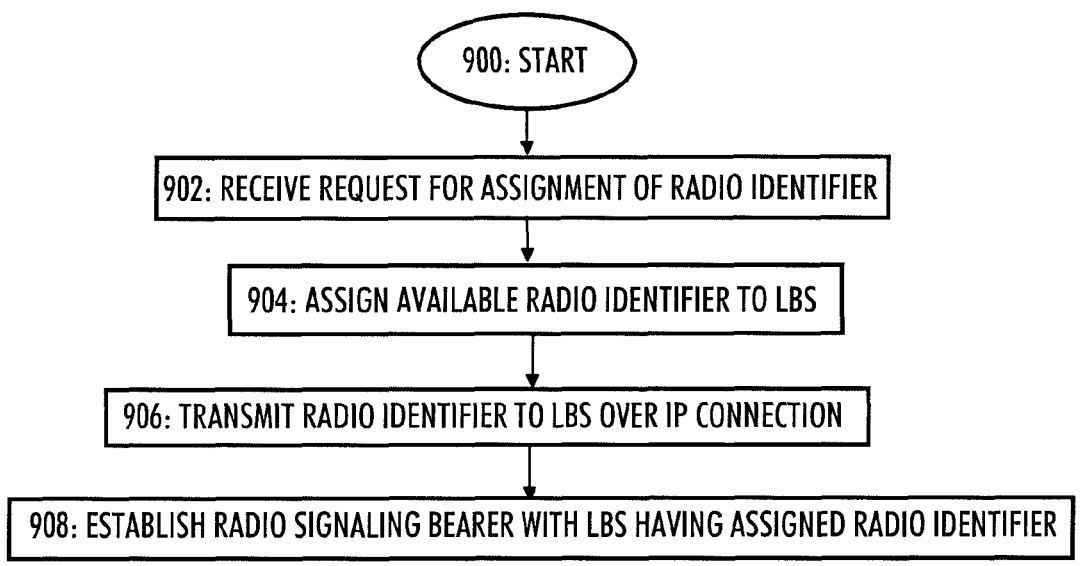
FIG. 9 illustrates a process for carrying out authentication in the wide area base station of FIG. 6.

As mentioned above, the elements that may participate in the authentication process according to an embodiment of the invention include the LBS, NCS and WBS. FIGS. 4 to 6 illustrate exemplary structures of these elements and FIGS. 7 to 9 illustrate processes carried out in the respective elements of FIGS. 4 to 6. FIG. 4 illustrates the exemplary structure of the LBS. Referring to FIG. 4, the LBS comprises a first communication interface 400 configured to establish the wired IP connection with the NCS. The first communication interface 400 may comprise hardware and software configured for this purpose. The LBS further comprises a second communication interface 402 configured to establish radio connections with other wireless communication devices, such as user terminals and other base stations, e.g. WNBs. The second communication interface 402 may comprise radio frequency components and base band components and software dedicated for transmission and reception of radio signals.

The communication carried out in the LBS is controlled by a communication controller 404 comprising two sub-controllers 406, 408 for each type of connection. An IP connection controller 406 has an interface to connect with the first communication interface 400, and it is configured to control the operation of the wired IP connection and the information transferred over the IP connection. A radio controller 408 has an interface to connect with the second communication interface 402, and it is configured to control the operation of the radio connections and the information transferred over the radio connections. The higher-level communication controller 404 controls both sub-controllers 406, 408 and exchange of the information between the two sub-controllers 406, 408. Let us examine the operation of the communication controller 404 and the LBS with reference to FIG. 7 describing a process for carrying out initial configuration and authentication in the LBS.

The process starts in block 700. In block 702, the LBS is activated, e.g. powered-up or reset. The reset may have occurred in response to a control signal received from another network element over the IP connection or over the signaling radio bearer. Upon activation of the LBS, the communication controller 404 instructs the IP connection controller 406 to establish the wired IP connection with the NCS in block 704, and the IP connection controller negotiates the IP connection with the NCS server. The establishment of the wired IP connection as such is well known in the art, so it is not discussed in greater detail. In block 706, the communication controller 706 instructs the radio controller 408 to configure radio receiver components of the second communication interface 402 to start reception of broadcast radio signals transmitted by WNBs. The radio controller 408 then analyses the received broadcast signals, detects classifications of the neighboring WNBs contained in the received broadcast signals, and forwards the detected classifications with the identifiers of the corresponding WNBs to the communication controller 404. The communication controller detects among the received WNB identifiers and classifications a WBS that provides the services the LBS needs by comparing the received classifications with a required classification stored in a memory unit of the LBS. For example, the LBS may require the serving WBS to be equipped with O&M functionalities to assign radio identifiers. Additionally, the LBS may require that the WBS is capable to carry out RRM operations and/or to relay S1/X2 connections wirelessly. Upon detection of such a WBS meeting the requirements, the communication controller 404 instructs the IP connection controller to transmit an authentication and initial configuration request message comprising the identifier of the selected WBS to the NCS over the wired IP connection. The IP connection controller transmits the message to the NCS in block 708.

In block 710, the IP connection controller 406 receives over the wired IP connection a message comprising an identifier allocated to the LBS. The message may also comprise other types of initial configuration information for the LBS, e.g. parameters for establishment of the signaling radio bearer with the selected WBS. The IP connection controller 406 extracts the identifier and the other information from the received message and forwards the information to the communication controller 404. The communication controller 404 then instructs in block 712 the radio controller 408 to establish a radio connection with the WBS by using the received identifier, as described above in connection with FIG. 3. The radio controller 408 then controls the second communication interface 402 to establish the radio connection, comprising establishment of the signaling radio bearer with the WNB.

FIG. 5 illustrates an exemplary structure of the NCS according to an embodiment of the invention. In this example, the NCS is an O&M server and, therefore, comprises an O&M controller 500, but the O&M controller may be replaced with a mobility management controller, when the NCS is an MME, or by a routing controller when the NCS is a gateway node. The functionalities of the O&M server, MME, and gateway node are as such known in the art of modern cellular telecommunication networks and will not be discussed in greater detail. The NCS comprises a communication interface 504 configured to establish the wired IP connections with WBSs and LBSs within a cellular network of one or more network operators. For example, the O&M server may be a third party server configured to operate and maintain base stations in networks of multiple operators. The communication interface 504 may comprise hardware and software configured for this purpose. The NCS may further comprise an IP connection controller 502 configured to operate multiple IP connections established between the NCS and the other network elements. The operation & maintenance controller 500 is configured to carry out operation and maintenance functionality in the network. This may include cell configuration in connection with initialization, reactivation or removal of new base stations in the network. Let us now examine the operation of the NCS with reference to a flow diagram of FIG. 8 illustrating a process for assisting the authentication of a newly activated LBS.

The process starts in block 800. In block 802, the IP connection controller 502 receives a request for authentication and initial configuration from a newly activated LBS over a wired IP connection established between the NCS and the LBS. The request may contain an indication that the LBS wants to be served by a WBS identified in the received request. If the NCS is O&M server, the IP connection controller 502 may forward the request to the O&M controller 500, and the O&M controller 500 may then instruct the IP connection controller 502 to transmit a request for identifier assignment to the WBS identified in the request received in block 804. The IP connection controller the forms an identifier request message and transmits the message to the designated WBS. If the NCS is MME or another type of NCS, the IP connection controller 502 may simply forward the request to the identified WBS through the communication interface 504 in block 804.

In block 806, the IP connection controller 502 receives from the WBS a radio identifier assigned to the LBS. If the NCS is an O&M server, the IP connection controller 502 may forward the received identifier to the O&M controller 500, and the O&M controller 500 may then store the identifier. The O&M controller 500 may also carry out other initial configuration operations with respect to the LBS and, then, instruct the IP connection controller 502 to transmit the radio identifier and the other configuration parameters to the LBS through the communication interface 504 in block 808. If the NCS is an MME or another type of NCS, the IP connection controller 502 may simply forward the radio identifier to the LBS in block 808. Additionally, the IP connection controller 502 may receive other initial configuration information from the WBS in block 806, such as parameters related to the establishment of the signaling radio bearer. The IP connection controller may forward also this information to the LBS.

FIG. 6 illustrates an exemplary structure of the WBS according to an embodiment of the invention. As the LBS the WBS also comprises a first communication interface 610 configured to establish wired IP connections to other network elements of the cellular network, a second communication interface 612 configured to operate radio connections within the cell controlled by the WBS. Furthermore, the WBS comprises a communication controller 604 comprising two sub-controllers 606 and 608 for wired and wireless connections. The functionalities of the IP connection controller 606 and the radio controller 608 may on a general level correspond to those of the controllers 406 and 408, respectively. On a detailed level, their operation is different due to the additional functionalities in other parts of the WBS, as will become obvious from the following description. Similarly, the functionalities of the communication interfaces 610 and 612 may on a general level correspond to those of the interfaces 400 and 402, respectively. Due to the different communication parameters and possibly capabilities, the detailed operation of the communication interfaces (400 & 610; 402 & 612) may differ from each other.

Additionally, the WBS comprises an O&M controller 600 configured to carry out at least part of the functionalities of an O&M server. The O&M controller 600 may comprise an identifier assignment unit (IAU) 602 as a sub-controller. The IAU 602 may be configured to carry out management and assignment of identifiers at least within the cell controlled by the WBS. Additionally, the IAU 602 may handle the management of identifiers in a wider area, e.g. in neighboring cells. Let us now examine the operation of the WBS with reference to the flow diagram of FIG. 9 illustrating a process for authenticating a newly activated LBS.

The process starts in block 900. In block 902, the IP connection controller 610 receives over the wired IP connection a request for assignment of a radio identifier to a newly activated LBS requesting for the assignment. The IP connection controller 606 then forwards the request to the communication controller 604 which then forwards the request to the O&M controller 600. The O&M controller 600 then instructs the IAU 602 to assign a radio identifier to the LBS. The IAU 602 then checks a record stored in a memory unit for free identifiers (C-RNTIs and/or RACH preambles), assigns a free identifier to the LBS in block 904, and marks the identifier as an assigned identifier in the record. Then, the IAU 602 sends the assigned identifier to the O&M controller 600, and the O&M controller 600 instructs the communication controller 604 to transmit the identifier to the LBS over the IP connection. The O&M controller 600 may also assign other initial configuration parameters to the LBS and send them together with the identifier. The communication controller 604 instructs the IP connection controller 606 to transmit the identifier and other O&M parameters to the LBS over the IP connection in block 906, and the IP connection controller 606 transmits the information through the first communication interface 610 in block 906. Additionally, the communication controller 604 may assign initial communication parameters, e.g. signaling radio bearer parameters to the upcoming signaling radio connection with the LBS, and instruct the IP connection controller 606 to transmit the communication parameters to the LBS together with the identifier. The communication controller 604 may also apply the communication parameters and the identifier of the LBS to the radio controller 608 so that the radio controller is prepared for the upcoming connection request from the LBS.

In block 908, the radio connection controller 908 receives through the second communication interface 612 a communication connection request from the LBS. The radio controller 908 then establishes the radio communication connection with the LBS with the pre-configured parameters, including establishment of the signaling radio bearer.

The controllers referred to in each of the FIGS. 4 to 6 may be executed in one or more processors. Accordingly, while the controllers of a network element (LBS, NCS, or WBS) are described as separate controllers, their functionalities may still be carried out by a single physical processor. In fact, the different controllers may simply be different software modules executed in the same processor. Generally the processor is a central processing unit, but the processor may be an additional operation processor supporting a central processing unit. The processor may comprise a computer processor, application-specific integrated circuit (ASIC), field-programmable gate array (FPGA), and/or other hardware components that have been programmed in such a way to carry out one or more functions of a given embodiment.

The processes or methods described in FIGS. 2 and 7 to 9 may also be carried out in the form of a computer process defined by a computer program. The computer program may be in source code form, object code form, or in some intermediate form, and it may be stored in a computer-readable distribution medium which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. In particular, while the description of the embodiments refers to the evolution versions of the UMTS and protocols used in the E-UTRAN, the general concepts of the invention are applicable to other cellular telecommunication systems as well. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
receiving via an IP connection a request for authentication and initial configuration from a newly activated local area base station, wherein the request contains an indication that the local area base station is associated with a sub-cell located within a coverage area a one or more wide area base stations of a cellular telecommunication system;
transmitting via the IP connection a request message for a radio communication identifier to a selected wide area base station of the one or more wide area base stations wide area base station;
receiving via the IP connection from the selected wide area base station the radio communication identifier assigned to the local area base station; and
transmitting the radio communication identifier to the local area base station over a wired connection.

2. The method of claim 1, wherein the radio communication identifier transferred to the local area base station comprises a cellular network identifier to be used in wireless communication between the local area base station and the wide area base station.

3. The method of claim 1, wherein the radio communication identifier transferred to the local area base station comprises a random access channel preamble used by the local area base station when establishing a communication connection with the wide area base station.

4. The method according to claim 1, further comprising:
arranging transfer of parameters needed for establishment of a signaling radio bearer between the local area base station and the wide area base station, wherein the parameters are transferred over the wired connection; and
establishing the signaling radio bearer according to the transferred parameters.

5. The method according to claim 1, wherein the method is executed in the local area base station, the method further comprising:
activating the local area base station;
establishing the wired connection with a network element of the cellular telecommunication system;
detecting, in the local area base station, the wide area base station capable of providing the local area base station with determined management services, wherein the detection is based on information contained in a radio signal received from the wide area base station; and
transmitting the information identifying the wide area base station to the network element.

6. The method of claim 5, the detection comprising:
receiving, from one or more wide area base stations a broadcast signal;
determining, from base station classification information contained in the received broadcast signals, whether or not one or more of the wide area base stations are provided with the capability to perform operation and management operations with respect to other base stations; and selecting a wide area base station equipped with the capability to serve the local area base station.

7. The method according to claim 1, wherein the method is executed in a network element operationally connected to the local area base station and the wide area base station, the method further comprising:
receiving information identifying the wide area base station from the local area base station in the network element;
transmitting to the wide area base station a message comprising a request for assignment of the radio communication identifier to the local area base station;
receiving from the wide area base station a message comprising the assigned radio communication identifier of the local area base station; and
transmitting the radio communication identifier to the local area base station.

8. The method according to claim 1, further comprising:
receiving, in the wide area base station, a request for assignment of the radio communication identifier to the local area base station through a wired connection;
assigning the radio communication identifier to the local area base station; and
transmitting the radio communication identifier to the local area base station over the wired connection.

9. An apparatus comprising a controller configured to:
receive via an IP connection a request for authentication and initial configuration from a newly activated local area base station, wherein the request contains an indication that the local area base station is associated with a sub-cell located within a coverage area of one or more wide area base stations of a cellular telecommunication system;
transmit via the IP connection a request message for a radio communication identifier to a selected wide area base station of the one or more wide area base stations wide area base station;
receive via the IP connection from the selected wide area base station the radio communication identifier assigned to the local area base station; and
transmit the radio communication identifier to the local area base station over a wired connection.

10. The apparatus of claim 9, wherein the radio communication identifier transferred to the local area base station comprises a cellular network identifier to be used in wireless communication between the local area base station and the wide area base station.

11. The apparatus of claim 9, wherein the radio communication identifier transferred to the local area base station comprises a random access channel preamble used by the local area base station when establishing a communication connection with the wide area base station.

12. The apparatus according to claim 9, wherein the controller is further configured to arrange transfer of parameters needed for establishment of a signaling radio bearer between the local area base station and the wide area base station, wherein the parameters are transferred over the wired connection, and to establish the signaling radio bearer according to the transferred parameters.

13. The apparatus according to claim 9, wherein the apparatus is applicable to the local area base station and wherein the controller is further configured to activate the local area base station, to establish the wired connection with a network element of the cellular telecommunication system, to detect the wide area base station capable of providing the local area base station with determined management services, wherein the detection is based on information contained in a radio signal received from the wide area base station, and to transmit the information identifying the wide area base station to the network element.

14. The apparatus of claim 13, wherein the controller is configured to carry out the detection by:
receiving a broadcast signal originating from one or more wide area base stations;
determining, from base station classification information contained in the received broadcast signals, whether or not one or more of the wide area base stations are provided with the capability to perform operation and management operations with respect to other base stations; and
selecting a wide area base station equipped with the capability to serve the local area base station.

15. The apparatus according to claim 9, wherein the apparatus is applicable to a network control entity having the wired connection established with both local area base station and the wide area base station, and wherein the controller is further configured to receive, from the local area base station in a network element having established a wired connection with both the wide area base station and the local area base station, information identifying the wide area base station, to transmit to the wide area base station a message comprising a request for assignment of the radio communication identifier to the local area base station, to receive from the wide area base station a message comprising the assigned radio communication identifier of the local area base station, and to transmit the radio communication identifier to the local area base station.

16. The apparatus according to claim 9, wherein the apparatus is applicable to the wide area base station, and wherein the controller is further configured to receive a request for assignment of the radio communication identifier to the local area base station through a wired connection, to assign the radio communication identifier to the local area base station, and to transmit the radio communication identifier to the local area base station over the wired connection.

17. A computer program product embodied on a non-transitory medium readable by a computer and comprising program instructions which, when loaded into an apparatus, execute or control the following:
receiving via an IP connection a request for authentication and initial configuration from a newly activated local area base station, wherein the request contains an indication that the local area base station is associated with a sub-cell located within a coverage area of one or more wide area base stations of a cellular telecommunication system;
transmitting via the IP connection a request message for a radio communication identifier to a selected wide area base station of the one or more wide area base stations wide area base station;
receiving via the IP connection from the selected wide area base station the radio communication identifier assigned to the local area base station; and
transmitting the radio communication identifier to the local area base station over a wired connection.

\* \* \* \* \*

UNITED STATES PATENT AND TRADEMARK OFFICE
CERTIFICATE OF CORRECTION

| | | |
|---|---|---|
| PATENT NO. | : 8,971,798 B2 | Page 1 of 1 |
| APPLICATION NO. | : 13/131909 | |
| DATED | : March 3, 2015 | |
| INVENTOR(S) | : Frederiksen et al. | |

It is certified that error appears in the above-identified patent and that said Letters Patent is hereby corrected as shown below:

In the claims,

Claim 1, col. 12, line 19, third occurrence "a" should be deleted and --of-- should be inserted.

Signed and Sealed this
Twelfth Day of May, 2015

Michelle K. Lee
*Director of the United States Patent and Trademark Office*